Figure 1:
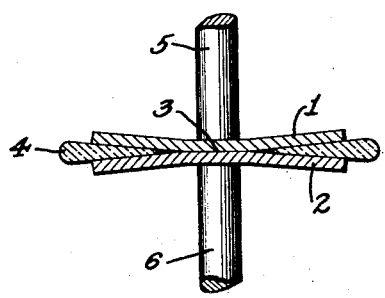

April 30, 1940.  L. GOODALE  2,198,769
METAL TO GLASS SEAL
Filed July 12, 1938   2 Sheets-Sheet 1

INVENTOR
LYNN GOODALE
BY
ATTORNEY

April 30, 1940.    L. GOODALE    2,198,769
METAL TO GLASS SEAL
Filed July 12, 1938    2 Sheets-Sheet 2

INVENTOR
LYNN GOODALE
BY
ATTORNEY

Patented Apr. 30, 1940

2,198,769

UNITED STATES PATENT OFFICE 2,198,769

METAL TO GLASS SEAL

Lynn Goodale, Newark, N. J., assignor to Federal Telegraph Company, Newark, N. J., a corporation of California Application July 12, 1938, Serial No. 218,865

15 Claims. (Cl. 176—35)

This invention relates to glass to metal seals and pertains more particularly to seals for the lead-in conductors of vacuum tubes.

It is an object of my invention to provide an improved form of metal to glass seal which is strong and easy to construct.

A further object of my invention is to provide a glass to metal seal which is adapted for use as part of the lead-in conductor system of a vacuum tube and when so used is capable of carrying heavy currents.

In accordance with my invention I provide a glass to metal seal by arranging between two metal discs or washers a ring of glass, then apply heat to the assembled parts to melt the glass, the entire assembly then being pressed together to bond the metal and glass firmly together. At the same time or subsequently, the two metal discs may be spot welded, brazed or soldered together to provide an electrical connection. According to an alternative form of my invention a single metal disc only is used, any necessary electrical connections being made to the two sides of the disc. The discs are preferably of a dished or slightly conical shape so that the centers thereof come into contact before the outer edges whereby the resulting glass seal is of tapered cross-section, the outer portion thereof adjacent the periphery of the metal discs being the thicker. Although the slightly conical form of disc is preferable any other shape thereof may be used which will provide the area of contact between the two discs adjacent to the center thereof.

During the formation of the seal by pressing the metal discs toward one another against the molten or plastic glass ring, the glass is extruded beyond the edges of the metal discs, thereby leaving an annular fin of glass which may be welded to the envelope of a glass tube, thereby forming with the glass tube an air-tight wall through which an electrical connection can be made by virtue of the weld between the metal discs.

The above mentioned and further objects and advantages of my invention and the manner of obtaining them will be more fully explained in the following description taken in conjunction with the accompanying drawings.

Figure 2:
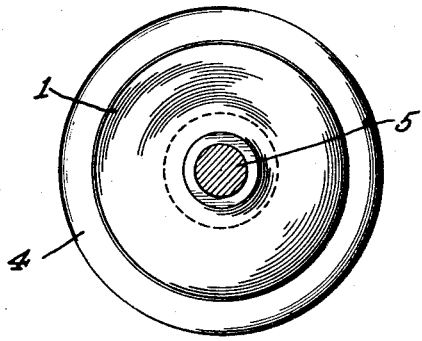
Figure 3:
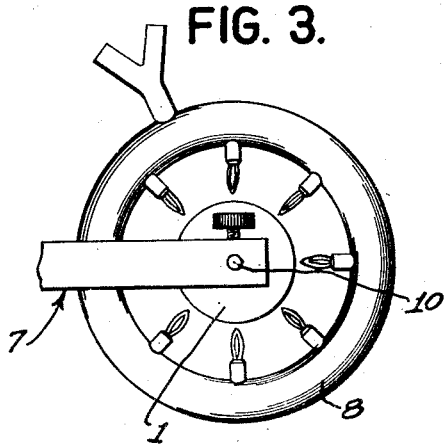
Figure 4:
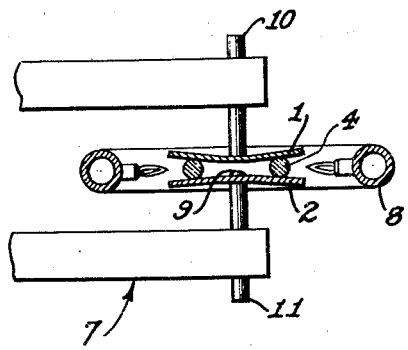
Figure 5:
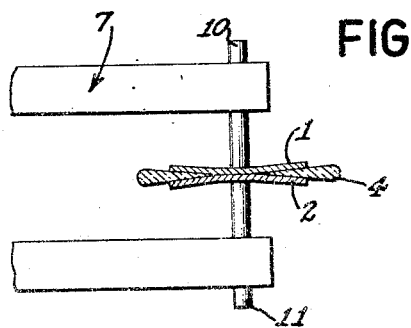
Figure 6:
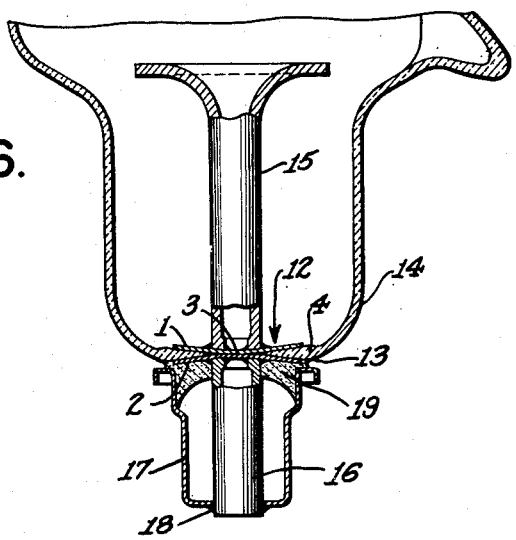
Figure 7:
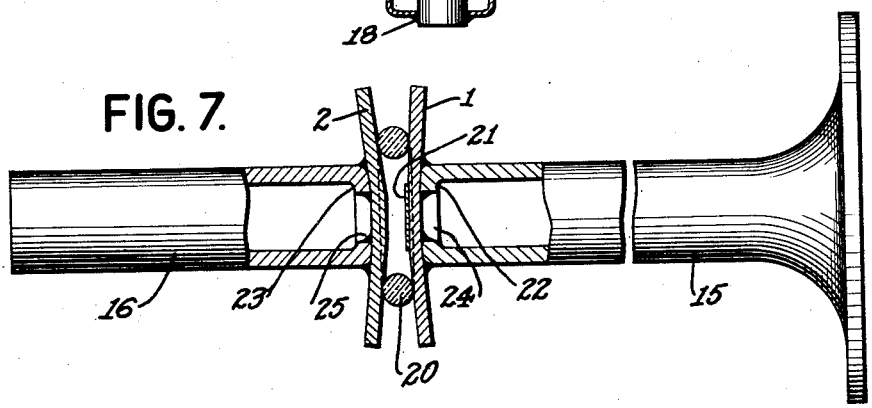
Figure 8:
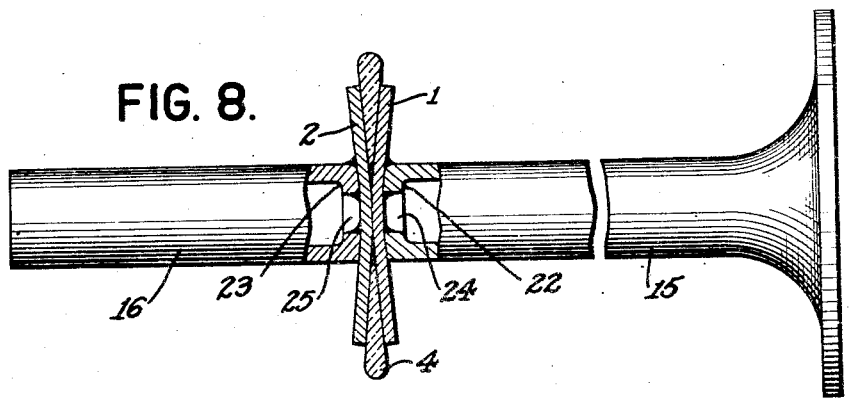

In the drawings,

Fig. 1 illustrates in side elevation and partly in section a seal constructed in accordance with my invention, Fig. 2 is a plan view of the seal shown in Fig. 1, Fig. 3 is a plan view and Figs. 4 and 5 are side elevational views illustrating one method of constructing the seal, Fig. 6 shows a section of a vacuum tube utilizing a seal constructed in accordance with my invention, and Figs. 8 and 7 are side elevational views partly in section illustrating one method of constructing the seal shown in Fig. 6.

Referring more particularly to the drawings, reference numerals 1 and 2 illustrate metal discs preferably welded together at their centers 3, and having therebetween and welded thereto, an annular ring or mass of glass 4. Support rods or lead-in conductors 5 and 6, are attached to the two discs 1 and 2, respectively.

Referring to Figs. 3, 4 and 5, the seal may be formed by placing the metal washers 1 and 2 with the glass ring between in the jaws 7 of a spot-welder and surrounding them by a ring burner 8 which serves to heat the metal discs and the glass, to soften the latter. As soon as the glass is soft enough the jaws of the spot-welder are forced together thereby squeezing the glass between the two metal discs 1 and 2 and welding the metal discs together. The glass is thereby forced outwardly as shown in Fig. 5, a sufficient quantity of glass being provided so that the resulting annular element of glass extends beyond the edges of the discs far enough to permit welding thereof to the envelope of a discharge tube or the like, with which it is desired to use the seal. The diameter of the glass ring is preferably large enough so that during the squeezing operation the hole in the glass ring is not completely closed, the remaining opening permitting electrical connection between the discs. As shown in this figure, the washers may be of frustro conical shape providing at their centers a flat welding surface. On this flat welding surface there may be provided a metal button 9 for aiding in the formation of the weld.

The metal discs are suitably of tungsten of any convenient thickness or diameter and the glass forming the seal may be that sold by the Corning Glass Works under the trade name "Nonex" and having approximately the following composition, 70% $SiO_2$, 6% $PbO_6$, 5% $Na_2K_2O$, 15% $B_2O_3$, and 1% $AlO_2$, or under the designation "705 Glass" having approximately the composition 67% $SiO_2$, 6.5% $Na_2O_3$, 22% $B_2O_3$, and 2% $Al_2O_2$. The tungsten is preferably oxidized prior to the application of pressure to weld the tungsten discs and glass together, since this assists in the welding operation. Fluxes may be used in the well known manner to assist in the welding operations. The button 9 may be of molybdenum or any other suitable material. In place of the tungsten and "Nonex" or "705 Glass" combination above mentioned other known combinations of metal and glass may be used. For example, copper discs may be used with lead or soda glass.

Alternatively one of the metal discs 1 and 2 may be omitted from the final seal and in this case during the forming process the place of the omitted disc will be taken by a metal pressure element which does not, because of cooling or some other well known precaution, wet the glass disc and form a weld therewith.

In Figs. 3, 4 and 5, elements 10 and 11 may be either conventional electrodes of the spot welder 7 or may be the support rods or lead-in conductors 5 and 6, shown in Fig. 1. With this latter arrangement the rods 5 and 6 may be joined to the discs 1 and 2 either before the clamping of the elements in the spot welder jaws to form the seal, or the weld between the rods 5 and 6 may be formed simultaneously with the weld between the discs 1 and 2 during the formation of the seal. According to an alternative procedure the weld between the two metal washers and the glass may be formed first and the weld between the metal discs be formed thereafter.

The shape of the discs is not limited to the form of a cone or a truncated cone since any dished form may be used, that is, a form wherein the center portion of at least one of the discs has a projection toward the other disc, so as to form a metallic contact when the seal is completed. In the case where a single disc alone is used, this disc should be dished so as to insure, as in the case of the pair of discs, that the glass at the point of sealing is tapered in its dimensions. Instead of using the washers of uniform thickness, as shown in the drawings, the edges thereof may be tapered to a knife edge or the washers may be of a solid conical shape, one side being flat and the other in the form of a cone.

Referring to Fig. 6 reference numeral 12 indicates generally a glass to metal seal such as shown in Fig. 1. The glass rim 4 of the seal is welded at 13 to the envelope 14 of a vacuum tube. Reference numerals 15 and 16 indicate respectively an electrode support element within the tube envelope and a contact element outside the tube element. A metal cap 17 is attached by solder 18 to the contact element 16 and by basing cement 19 to the glass envelope 14. The members 15 and 16 are tubular and are welded, brazed or soldered to the discs 1 and 2 respectively, while the latter are in like fashion electrically connected and mechanically joined at their centers.

Figs. 7 and 8 show the seal of Fig. 6 in different steps of manufacture. In Fig. 7 the electrode support 15 and the contact element 16 have been welded in hydrogen or otherwise joined to the discs 1 and 2 respectively. The glass ring for forming the seal is shown at 20 and a small piece of nickelmesh 21 is placed between the discs to aid in the spot welding of these discs to one another. Flanges 22 and 23 are provided at the ends of the elements 15 and 16 respectively to assist in forming a strong joint with the discs to which they are welded. The openings 24 and 25 provide space for spot welding electrodes to be inserted to weld the discs together. In Fig. 8 the seal is shown completed, the discs 1 and 2 being welded together and the glass ring 5 of Fig. 7 being squeezed to a washer-like form as shown at 4.

While I have described particular embodiments of my invention for the purpose of illustration, it should be understood that various modifications and adaptations thereof may be made within the spirit of the invention as set forth in the appended claims.

What I claim is:
1. A metal to glass seal comprising a pair of metal elements having opposed faces, a body of glass between said elements and welded thereto and a mechanically rigid conductive connection between said metal elements remote from the edges thereof.

2. A metal to glass seal comprising a pair of dished metal discs positioned in opposed relation with their centers in electrical contact and an annulus of glass welded between said discs and projecting beyond the edges thereof.

3. A metal to glass seal comprising a dish shaped metal disc and a second dish shaped metal disc positioned in opposed relation with the centers of these discs in rigid mechanical connection and an annulus of glass welded between said discs and projecting beyond the edges thereof.

4. A lead-in seal for sealing a conductor through a glass wall comprising two metal members each having an extended surface disposed so that said surfaces are juxtaposed opposite one another, a vitreous mass fused to both surfaces and joining said surfaces along an annular zone, and a conducting and mechanically reinforcing connection between said metal members inside said annular zone.

5. A metal to glass seal comprising a dished metal element having a washer of glass welded thereto and projecting beyond the edge thereof, the convex side of said metal element being in contact with said glass washer and the said washer being thicker at its outer edge than at its center, a member arranged on the side of said glass washer away from said metal element, and a rigid mechanical connection between said member and said metal element.

6. The method of forming a metal to glass seal between an annular shaped glass member and a convex metal disc and a connection to another member which comprises, placing said glass member in contact with said convex metal disc substantially around the apex thereof, heating said glass member to a softened condition and applying pressure to said glass member and said metal disc to squeeze said glass member into a relatively thin annular disc and effect a sealing connection between said glass member and said disc, arranging said other member on the side of said annular disc remote from said metal disc, and providing a strong mechanical connection between said disc and said other member.

7. The method of forming a lead-in seal for sealing a conductor through a glass wall, using two metal members each having an extended surface and at least one of said members having near its center a projection toward the other, which comprises assembling said metal members and a glass mass so that the glass is disposed between said metal members, heating said glass to a softened condition, applying pressure to said glass through said metal members, whereby the glass is squeezed toward said outer edges of the extended portions of said metal members, and forming a mechanically strong conductive connection between said metal members.

8. The method of forming a metal to glass seal between two metallic members and a glass wall comprising forming said metal members so that each has an extended surface of substantially convex outline, placing between said surfaces an annular glass member, heating said glass member to a softened condition and applying pressure to said metal members whereby said glass member is flattened and a portion thereof is forced outwardly toward the outer edge of said extended surfaces providing a mechanically rigid connection between said metallic members and joining said glass wall to said glass member.

9. The method of forming a metal to glass seal between two metallic members and a glass wall comprising forming said metal members so that each has an extended surface of substantially convex outline, placing between said surfaces an annular glass member, heating said glass member to a softened condition, applying pressure to said metal members whereby said glass member is flattened and a portion thereof is forced outwardly toward the outer edge of said extended surfaces, and the central portions of said extended metal surfaces are brought into contact, conductively interconnecting said metallic members at the surface of contact by welding, and joining said glass wall to said glass member.

10. The method of forming a metal to glass seal between two metallic members and a glass wall comprising forming said metal members so that each has an extended surface of substantially convex outline, placing between said surfaces an annular glass member, heating said glass member to a softened condition, applying pressure to said metal members whereby said glass member is flattened and a portion thereof is forced outwardly toward the outer edge of said extended surfaces, and the central portions of said extended metal surfaces are brought into contact, conductively interconnecting said members at the surface of contact by welding, and sealing a glass envelope to said flattened glass member.

11. The method of forming a lead-in seal for sealing a conductor through a glass wall, using two metal members each having an extended surface which comprises assembling said metal members and a glass mass so that the glass is disposed between said metal members, heating said glass to a softened condition, applying pressure to said glass through said metal members, whereby the glass is squeezed toward said outer edges of the extended portions of said metal members, conductively fastening together said metal members, and simultaneously spot welding the centers of the extended portions of said metal members together, whereby a conductive connection is formed through said glass seal.

12. The method of forming a lead-in seal for sealing a conductor through a glass wall, using two metal members each having an extended surface which comprises assembling said metal members and a glass mass so that the glass is disposed between said metal members, heating said glass to a softened condition, applying pressure to said glass through said metal members, whereby the glass is squeezed toward said outer edges of the extended portions of said metal members, conductively fastening together said metal members, simultaneously spot welding the centers of the extended portions of said metal members together, whereby a conductive connection is formed through said glass seal, and sealing to said squeezed glass portion a glass envelope.

13. The method of forming a metal to glass seal comprising forming a metal member with an extended surface, providing a second metal member formed with an extended surface, placing a mass of glass between said metal member first mentioned and said second member, heating said glass to a softened condition, applying pressure to said members to extrude said glass toward the outer edge of said metal member first mentioned and to seal said glass thereto, and forming a separate rigid mechanical connection between said metal member first mentioned and said second member.

14. The method of forming a metal to glass seal using a pair of metal elements having dish shaped faces and an annular glass member, comprising arranging said dish shaped elements in opposed relation with said glass member therebetween, heating said glass member to a softened condition, applying pressure to said disc shaped elements whereby said glass member is flattened and forced toward the outer edges of said elements and the center portions of said elements are brought substantially into contact, and forming an adhering connection between said elements.

15. A metal to glass seal for a vacuum vessel having an envelope comprising a pair of metal elements having opposed faces, a body of glass between said elements and welded to at least one of said metal elements to form an air tight seal, said envelope being joined to said body of glass, and a strong mechanical connection between said metal elements remote from the edges thereof.

LYNN GOODALE.